(No Model.) 10 Sheets—Sheet 1.
T. ALLEN.
BEDSTEAD.
No. 347,912. Patented Aug. 24, 1886.
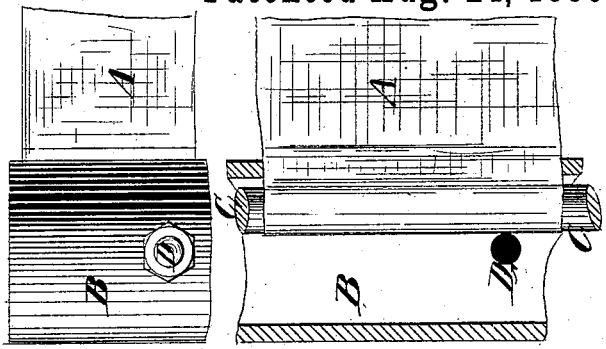
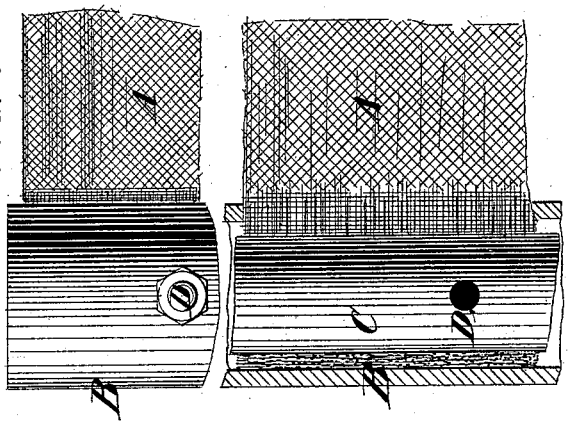
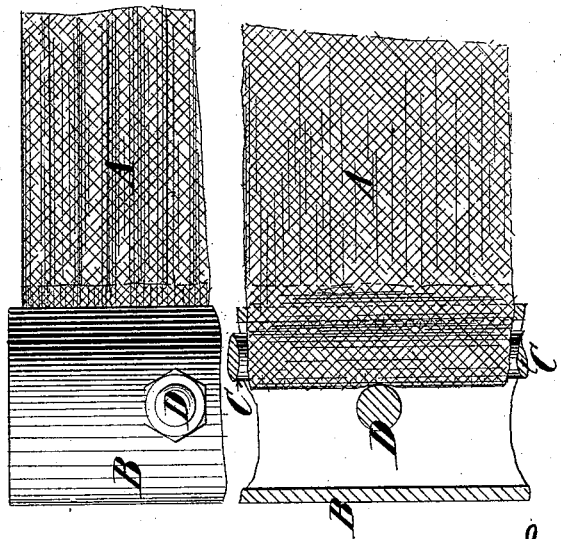
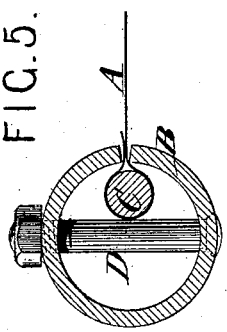
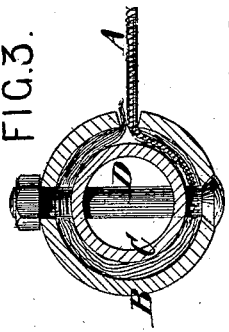
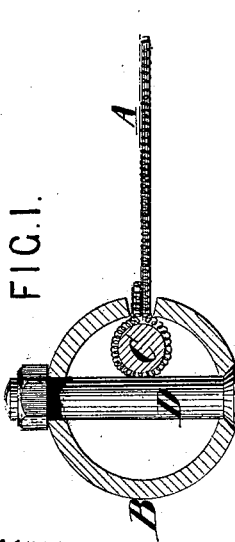
Witnesses
Chas H. Smith
J. Stail
Inventor
Thomas Allen
per Lemuel W. Serrell
Atty
N. PETERS, Photo-Lithographer, Washington, D. C.

(No Model.) 10 Sheets—Sheet 2.

T. ALLEN.
BEDSTEAD.

No. 347,912. Patented Aug. 24, 1886.

Witnesses
Chas. H. Smith
J. Stait

Inventor
Thomas Allen
per Lemuel W. Serrell, Atty.

(No Model.) 10 Sheets—Sheet 3.

T. ALLEN.
BEDSTEAD.

No. 347,912. Patented Aug. 24, 1886.

Witnesses
Chas. H. Smith
J. Staib

Inventor
Thomas Allen
per Lemuel W. Serrell
atty

N. PETERS. Photo-Lithographer, Washington, D. C.

(No Model.) 10 Sheets—Sheet 4.
T. ALLEN.
BEDSTEAD.
No. 347,912. Patented Aug. 24, 1886.
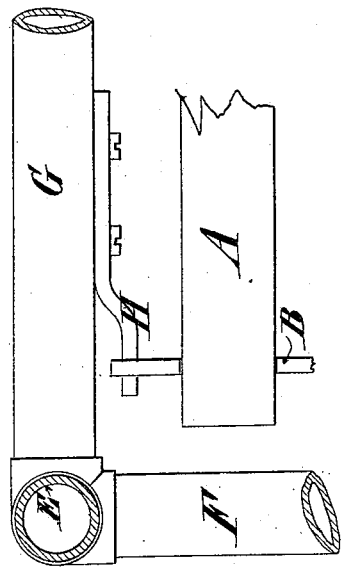
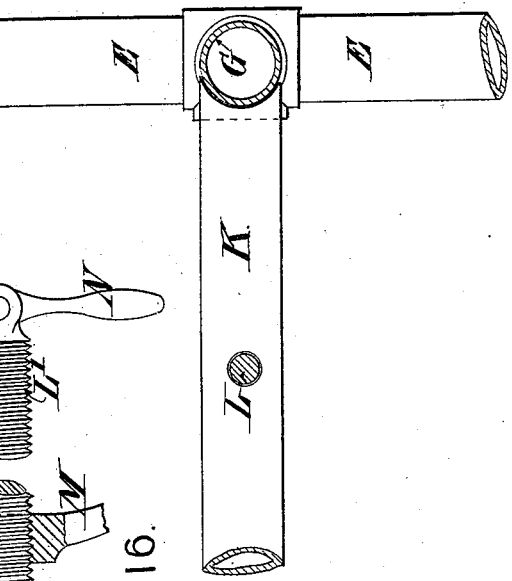
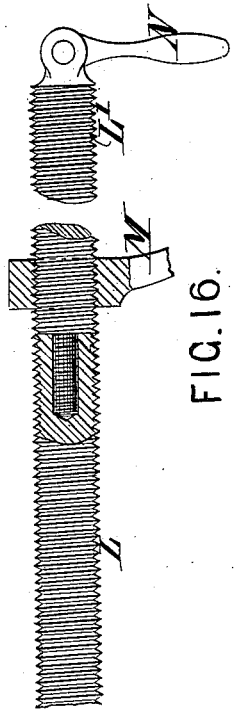
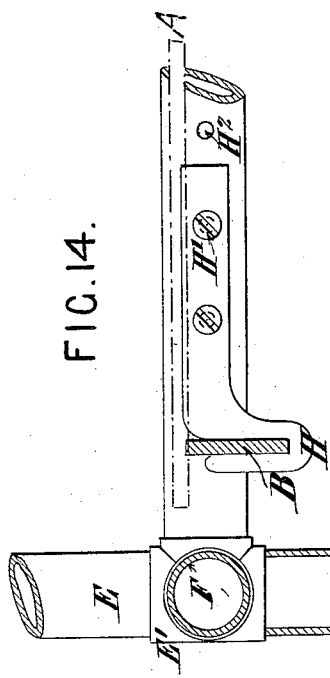
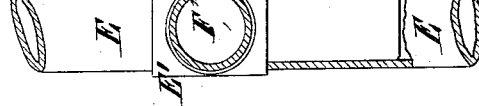

(No Model.) 10 Sheets—Sheet 5.
T. ALLEN.
BEDSTEAD.

No. 347,912. Patented Aug. 24, 1886.

(No Model.) 10 Sheets—Sheet 6.
T. ALLEN.
BEDSTEAD.
No. 347,912. Patented Aug. 24, 1886.
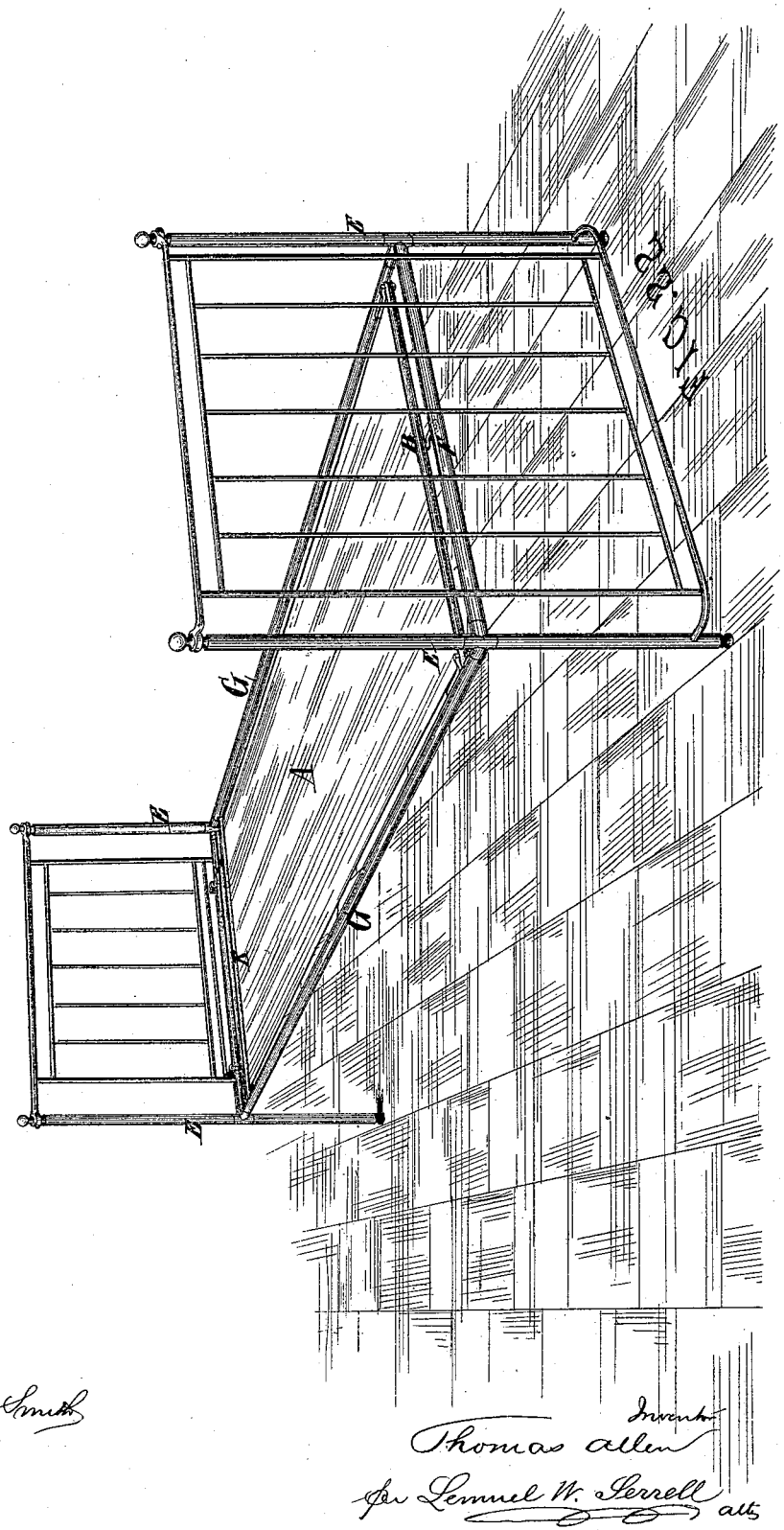

(No Model.) 10 Sheets—Sheet 7.
T. ALLEN.
BEDSTEAD.

No. 347,912. Patented Aug. 24, 1886.

Witnesses
Chas H Smith
J. Stait

Inventor
Thomas Allen
per Lemuel W. Serrell atty (No Model.) 10 Sheets—Sheet 8.
T. ALLEN.
BEDSTEAD.
No. 347,912. Patented Aug. 24, 1886.
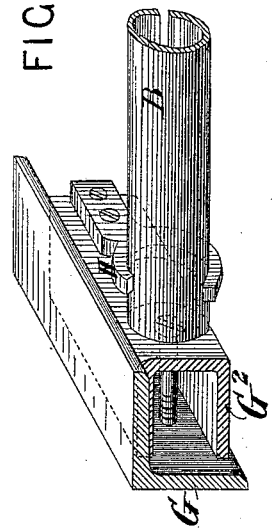
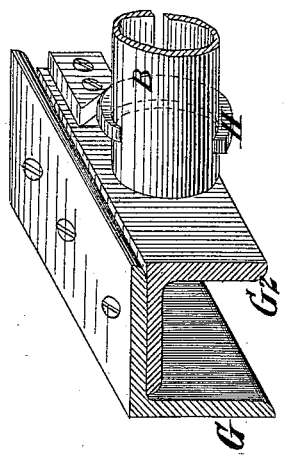
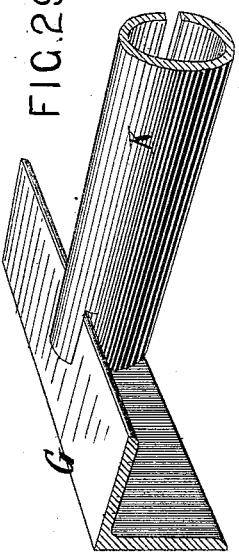
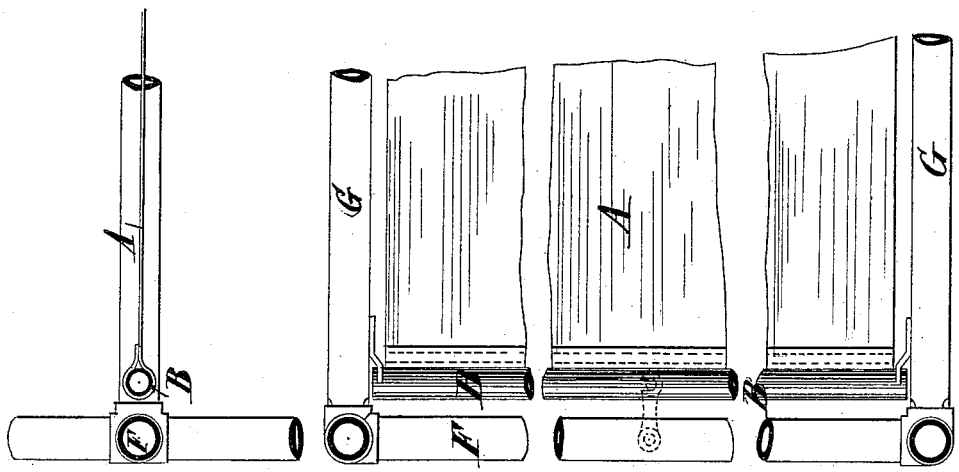
Witnesses
Chas H Smith
J. Staib
Inventor
Thomas Allen
per Lemuel W. Serrell
atty (No Model.)  
10 Sheets—Sheet 9.

T. ALLEN.
BEDSTEAD.

No. 347,912. Patented Aug. 24, 1886.

Witnesses  
Chas. H. Smith  
J. Staib

Inventor  
Thomas Allen  
per Lemuel W. Serrell (No Model.) 10 Sheets—Sheet 10.
T. ALLEN.
BEDSTEAD.
No. 347,912. Patented Aug. 24, 1886.
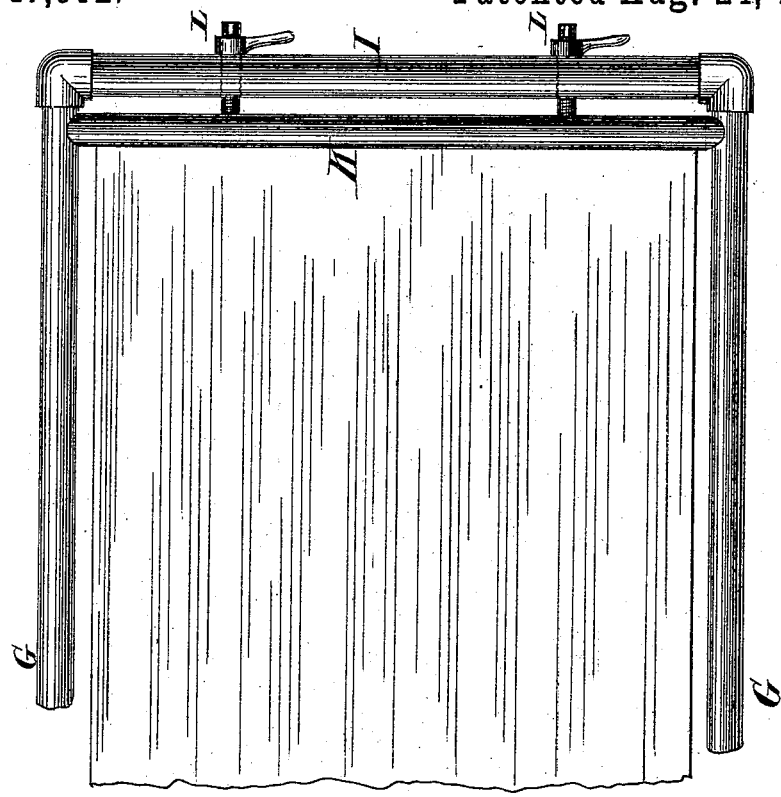
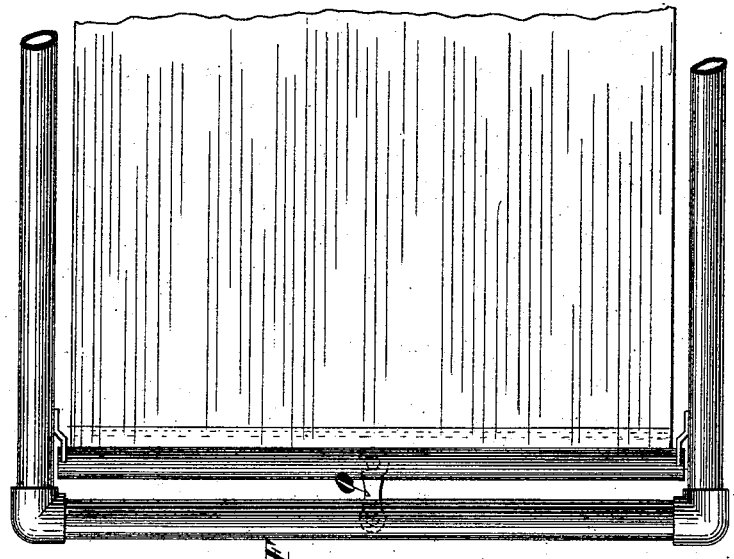
FIG. 31.

United States Patent Office.

THOMAS ALLEN, OF BRISTOL, COUNTY OF BRISTOL, ENGLAND.

BEDSTEAD.

SPECIFICATION forming part of Letters Patent No. 347,912, dated August 24, 1886.

Application filed June 30, 1884. Serial No. 136,332. (No model.) Patented in England January 17, 1884, No. 1,646.

*To all whom it may concern:*

Be it known that I, THOMAS ALLEN, a subject of the Queen of Great Britain, residing in the city and county of Bristol, England, have invented certain new and useful Improvements in Bedsteads and in the Mode of Fixing Woven Wire or other Flexible Material as a Bottom or Mattress, of which the following is a specification.
My improvements are chiefly applicable to ordinary metallic or other bedsteads, but may also be used for sofas and couches. These improvements refer more particularly to the mode of fixing the elastic bottom or mattress, which may be of metallic or other webbing, woven wire, canvas, or other suitable flexible material or fabric, &c. I attach one end of the woven wire or any other flexible material to a slitted transverse tube at foot end of bedstead, which tube rests upon or is supported partly by two suitable flanges or bearers screwed or riveted to the two tubular or otherwise shaped side rails of bedstead, metallic or non-metallic couches or sofas, while the other end of the woven wire or other flexible material is attached to a slitted transverse tube at head of bedstead, which tube is guided and supported by the two side rails of the bedstead. By flanges or bearers, as aforesaid, on the two tubular or otherwise shaped side rails, both ends of bedstead may be used for supporting an iron bar or tube for fixing the wooden laths or other suitable bottom material in position. The aforesaid movable transverse slitted tube, which grips the woven wire or other flexible material, is drawn toward the head of the bedstead for the purpose of giving the desired tension to the woven wire or other flexible material, and is adjusted by means of screws as follows: One end of each screw is fixed to the transverse slitted tube in any suitable manner, and is passed clear through the head-frame, and is formed of two or three parts, which are jointed or otherwise connected together. By means of screw-threaded handles or nuts applied to the outer end of the screws the movable transverse slitted tube holding the woven wire or other flexible material is pulled or drawn up toward the head-frame of bedstead, so as to tighten the woven wire or other flexible material to the required tension, whereupon the outer jointed or otherwise connected end of the screws are allowed to drop down or out of the way or made removable.

And in order that my invention may be more fully understood, I will describe the same with reference to the accompanying drawings.

Figure 1 is a vertical section, and Fig. 2 a plan partly in section, showing the mode in which one end of a bed-bottom of wove metallic wire or other flexible material is attached. The bottom A is inserted through a longitudinal slit in a transverse tubular head or foot bar, B, and passed around a bar, C, inside the tube B, and passed out through the slot again. The necessary gripping or jamming action is applied by means of screws D or rivets passing through the transverse slitted tube B, and nutted or riveted over underneath.

Fig. 3 is a cross-section, and Fig. 4 a part plan, partly in section, of a similar tubular slitted transverse head or foot bar, into which one end of the bed-bottom is inserted, and in which the inner bar, C, is made tubular, a little canvas webbing or sacking being inserted between the inner bar or tube, C, and the outer tube, B, and on each side of the woven wire, as shown.

Fig. 5 is a cross-section, and Fig. 6 a part plan, partly in section, of a similar slitted transverse bar for fixing one end of a canvas-bed-bottom; or the canvas may be sewed round the bar B, as will be seen in Figs. 22, 23, and 24, to be described later on.

Figure 7:
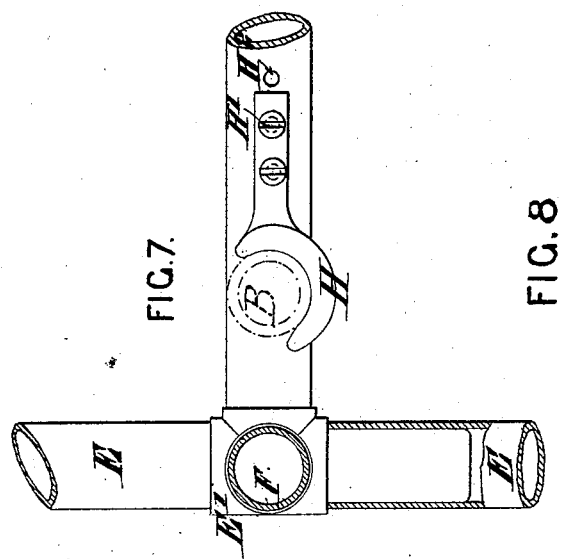
Figure 8:
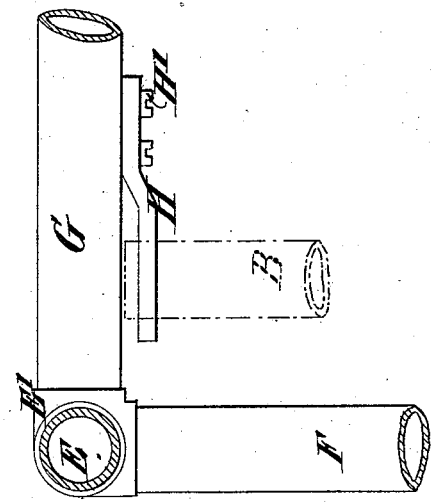

Fig. 7 is a part sectional side elevation showing a corner-post, E, which, by means of the ordinary socket, E', is united to the tubular head-rail F, and side rail, G. Fig. 8 is a part sectional plan view of same. The slitted tubular transverse foot-bar B, to which one end of the woven wire, canvas, or other flexible bed-bottom is attached in the manner already described or otherwise, is supported in flange-bearers H, which, by screws H', are fixed to the side rails, G. By means of the third additional tapped hole, H², the position of the bracket H can be at the first placed more toward the middle of the length of the bedstead, and later on, as the bed-bottom stretches, be shifted to the position shown.

Figures 10, 11:
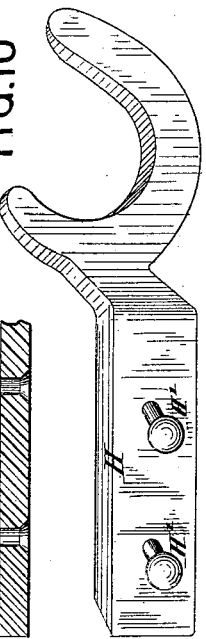
Figure 9:

Fig. 9 is a perspective view of part of one of the tubular side rails, G, of a bedstead, such rail being formed with three holes, H²; and Fig. 10 is a perspective view of a flange-bearer, H, and Fig. 11 a horizontal sectional view of part of the bearer H, which is provided with two headed pins, H', which are entered into two of the holes H² in the side rail, G, Fig. 9, and the shank part of the pins are then drawn home into the narrow slot part of the holes H², and thus holds the bearer in place.

Figure 12:
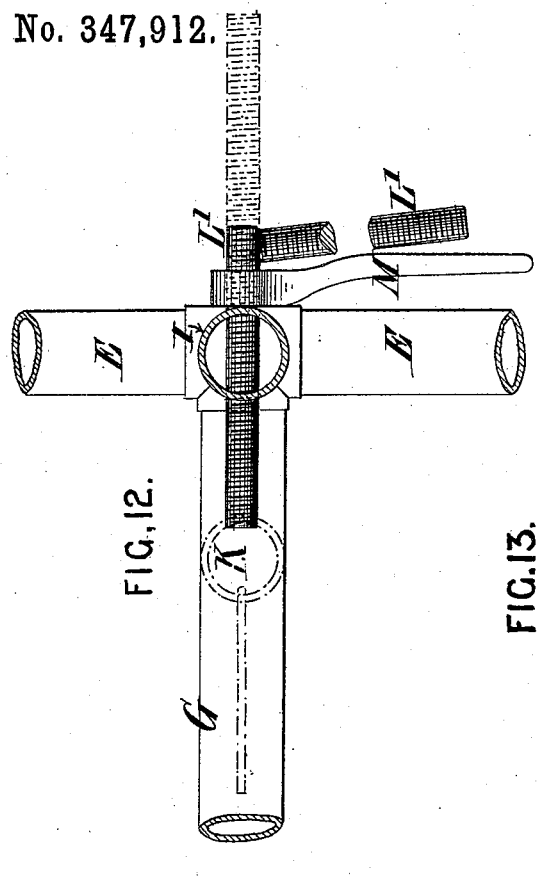
Figure 13:
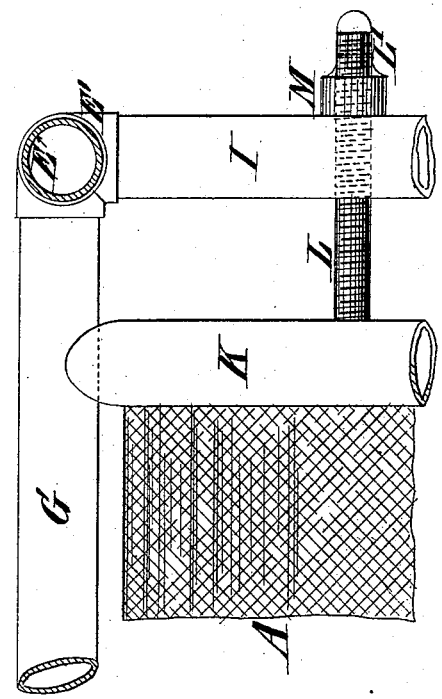

Fig. 12 is a part sectional elevation of a corner-post, E, of a tubular bedstead at the head of the bedstead, and Fig. 13 is a part plan view. G is the side rail, which is connected to the corner-post E by the usual socket, E', to which also the head-rail I is attached. K is a slitted tube to which the head end of the bed-bottom A is connected in the same manner as the foot end is connected to the transverse slitted tube B, Figs. 7 and 8, as already described with reference to Figs. 1 to 6. The slitted transverse tube K is guided and supported at each end by the two side rails, G, of the bedstead, and for this purpose each end of the transverse tube K is notched out half-circular, so as to fit easily against the side rails, G, and is drawn toward the head of the bedstead, in a manner presently to be described.

Fig. 14 is a part sectional side elevation, and Fig. 15 plan, showing another arrangement for supporting the foot and head ends of a bed-bottom, A, consisting of wooden laths, by means of the flange-bearers H, which are fixed to the side rails, G, as before described with reference to Figs. 7 and 8, or Figs. 9, 10, and 11, but formed to receive a rectangular transverse bar, B, on which the wooden laths A rest; or the bar B, on which the wooden laths A rest, may be tubular or any other suitable form, and the flange-bearers H modified in form accordingly. The movable transverse slitted tube K, Figs. 12 and 13, which grips the head end of the woven wire or other flexible bed-bottom, A, is drawn toward the head-rail I of the bedstead for the purpose of giving the desired tension to the bed-bottom A, and is adjusted by means of screws L, as follows: One end of each screw L is fixed to the transverse tube K in any suitable manner, and is passed clear through the head frame or rail I, and is formed of two or more parts, which are jointed together, as shown at L'. By means of screw-threaded handles or nuts M, applied to the outer ends of the screws L, the movable transverse tube K is pulled or drawn toward the head-frame I, so as to tighten the woven wire or other bottom, A, to the required tension, whereupon the outer jointed end, L', of the screws L are allowed to drop down or out of the way.

Fig. 16 is a part end view showing the head-rail I with two tightening-screws, L, through.

Fig. 17 is a part sectional view of another form of screw, where the outer end, L', is screwed into the inner end, L, and formed with a small jointed handle, N, for facilitating the connecting and disconnecting the outer end, L', from the inner end, L, of the screw.

Figure 18:
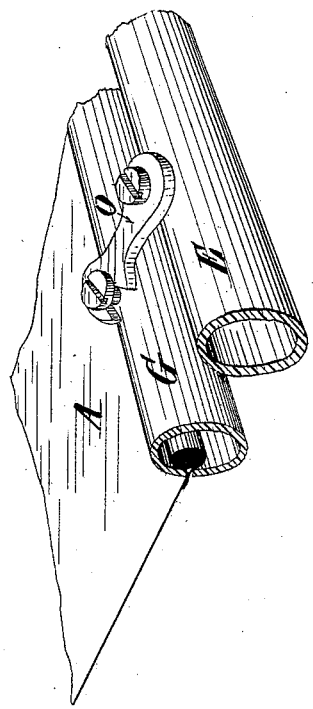

In order to prevent the transverse slitted tube B at the foot end of the bedstead from lifting out of the flange-bearers H, I may, as shown in the perspective part view of under side, Fig. 18, provide one or more hooks, O, on the under side of the slitted transverse tubular bar B at the foot of the bedstead for locking it to the foot-rail E of the frame.

Figure 19:
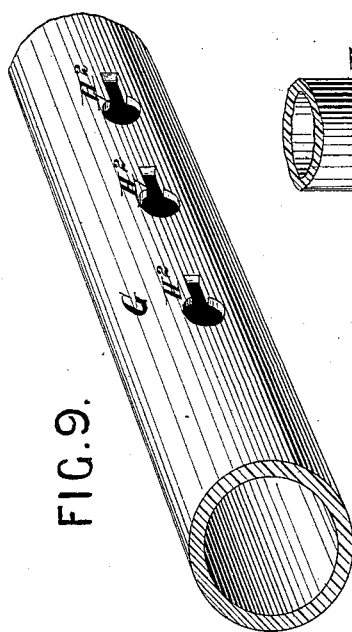
Figure 20:
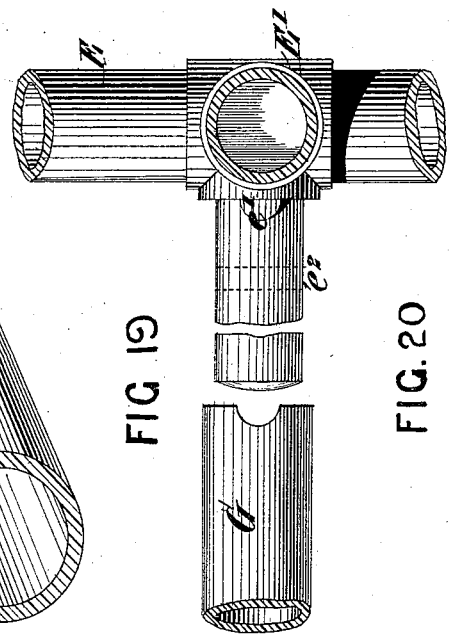

Fig. 19 is a side view, and Fig. 20 part sectional plan view, showing the mode in which I prefer to connect the side rails, G, to the sockets E' of the corner-posts E, for the purpose of easily finding and keeping their required relative position, and so that the flange bearers or hooks H, Figs. 7, 8, 9, and 10, come in their right place. For this purpose I form the socket E' on each side with a half-round or other suitable projection, e', and I form the side rail, G, with corresponding notches, as shown. The holes e² for the pin which serves to secure the parts together will thus be sure to be opposite each other, and the holes for the flange-bearers H be in the right place for the bearers H to be fixed.

Figure 21:
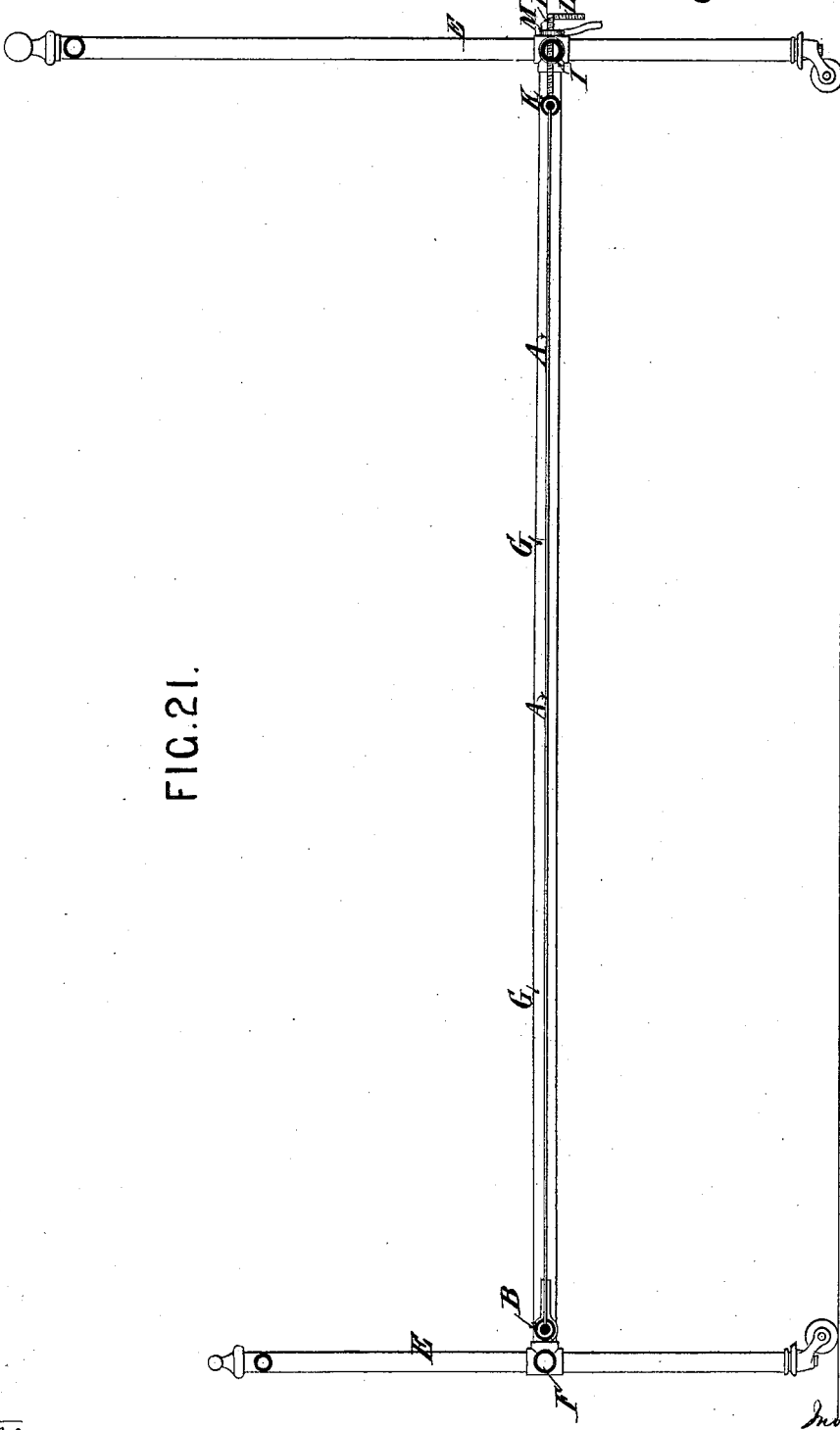

Fig. 21 is a vertical longitudinal section, and Fig. 22 perspective view, of a bedstead constructed and fitted as above described.

Fig. 23 is a vertical section of part of the head end, and Fig. 24 part plan, of a bedstead in which the bed-bottom is made of canvas, which is sewed round the transverse tube B.

Figures 25, 26:
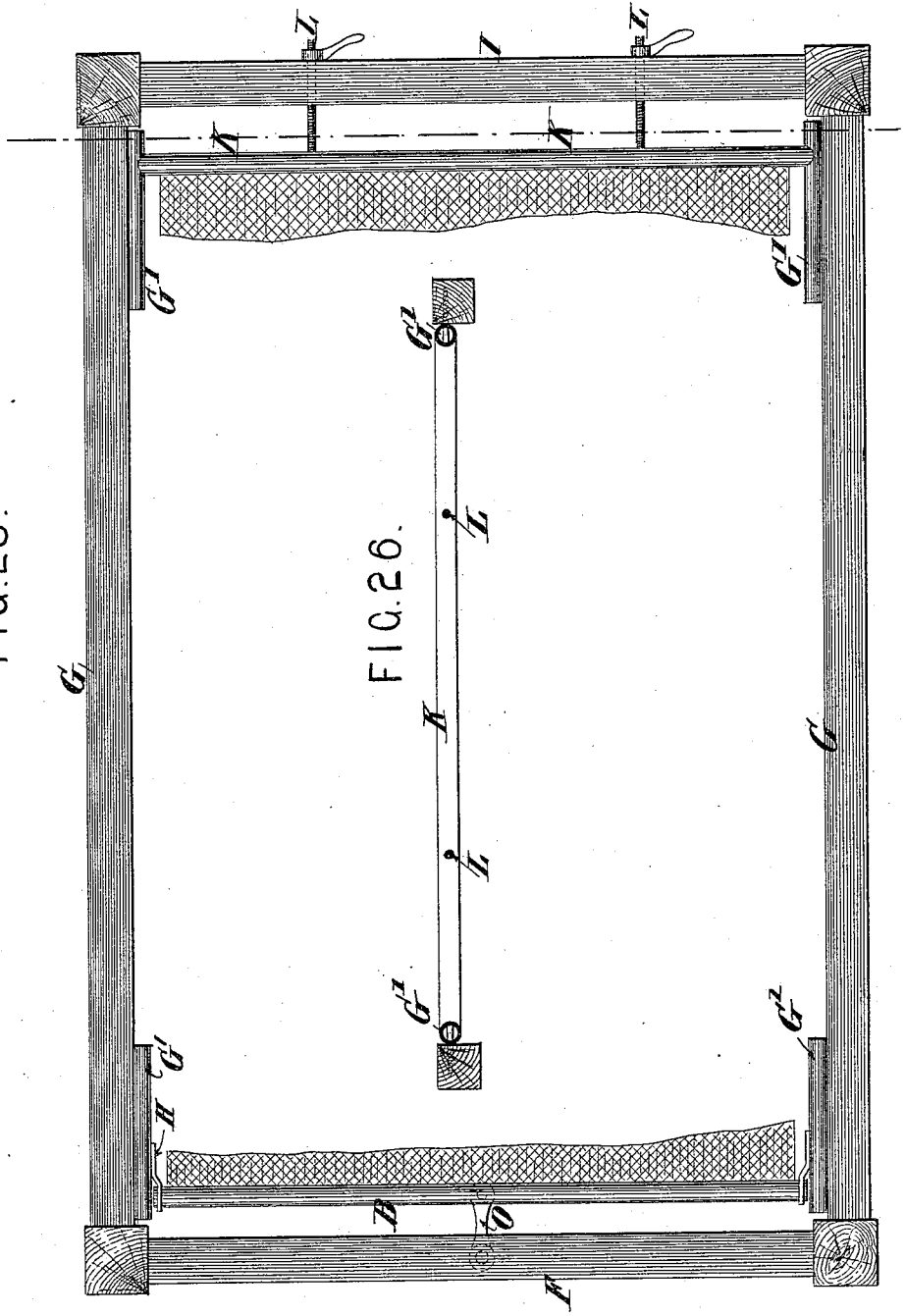

Fig. 25 is a plan section, and Fig. 26 a transverse section, illustrating the mode in which the invention may be applied to a wooden bedstead. G' G' are pieces of tube or other shaped iron, about twelve inches long, which are fixed to the inner sides, G, of the bedstead at head end, and form the support for the movable slitted tube K, the transverse slitted tube B at the foot end being supported by the two flanges H. (See Fig. 7.) The tightening-screws L are passed through the head end of the bedstead. These screws are constructed as described with reference to Figs. 12 and 13 or 16 and 17.

Figs. 27, 28, and 29 illustrate the mode in which the invention is or may be applied to an ordinary bedstead with angle-iron frame. Fig. 27 is a perspective view showing the slitted tubular transverse bar B (to which the foot-end of the flexible bed-bottom is fixed) resting in the flange-bearer H, this latter being fixed to a filling-piece, G², which is fixed to the side web or to the upper web of the angle-iron side rail, G, of the bedstead-frame.

Fig. 28 shows a somewhat similar arrangement, but with an angular filling-piece, G², fixed to the upper web of the side rail, G. Fig. 29 is a perspective view showing part of the side rail, G, with part of the transverse movable slitted tube K, formed with a slot at each end for guiding it on the upper web of the angle-iron side rail, G.

Figure 30:
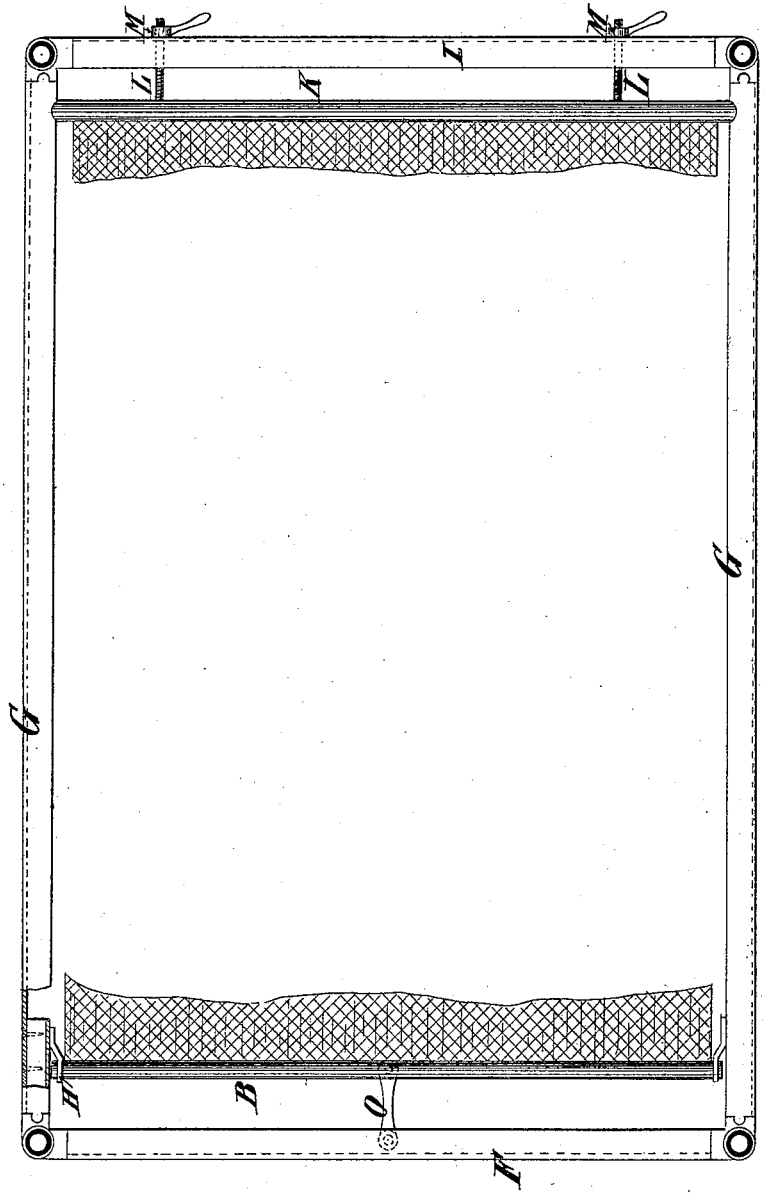

Fig. 30 is plan section of an angle-iron-frame bedstead constructed as just described.

The form and arrangement of the transverse slitted tube B at foot end of bedstead will vary somewhat in accordance with the form of the side frames of the metallic or other bedstead, sofa, or couch, and so also the form and arrangement of the flange-bearers H.

The movable transverse tube K may be arranged at the foot end of bedstead instead of the head end.

Fig. 31 is plan view showing the bed-bottom on a separate frame, F G G I, which can be placed on an ordinary iron or wooden bedstead and resting on the side rails or end rails, or both.

By the above improvements I provide an elastic or flexible bottom of woven wire, canvas, or any other suitable flexible material with any desired tension, and which can be fixed or removed in a few minutes without tools of any description.

I am aware of Hill's British Patent No. 4,635 of 1883, wherein a flexible bed-bottom is attached to a cross-bar at each end, and is tightened by means of ordinary screws at both ends of the bedstead; but it is not provided with lateral guides for the cross-bars to slide on, so that the vertical weight comes onto the tightening-screws.

I am also aware of Stewart's United States Patent No. 251,482, in which a flexible bed-bottom is supported at each end only, but having no lateral guides, and is tightened by swivel-screws or by an ordinary screw and nut at one end, both of which arrangements involve a loss of space at that end of the bedstead.

I am also aware of Billings' English Patent No. 534 of 1853, in which is described a flexible bed-bottom fixed at each end and at the sides to rods apparently contained within a slotted tubular bar, but without provision for tightening the bed-bottom and without my cross-bolts d for clamping the parts.

I am also aware of Case's United States Patent No. 268,356, in which the flexible bed-bottom is fixed between the two halves of a cross-bar at each end, and is tightened by a lateral lever.

I am also aware of Russell's English Patent No. 21,519 of 1858, in which a corded bed-bottom is supported by screw-threaded hooks on all four sides, which take the entire vertical weight.

I am also aware of La Mothe's United States Patent No. 264,711, in which is described a wire bed-bottom supported at each end by hooks which take the entire vertical weight, being without lateral guides for same.

I am also aware of the British patent of Peyton, Harlow, and Horne, No. 11,708 of 1847, in which a bed-bottom is supported by hooks fixed on the ends of the bedstead, and which are not adjustable.

I claim as my invention—

1. In combination with a flexible bed-bottom, which at one end is held and supported on the bedstead-frame and at the other end has a movable cross-bar which is guided between the side rails of the bedstead-frame, the tightening-screws L L', each made in two parts connected together by a joint-pin and secured at one end in the movable cross-bar, and passing through the end rail of the bedstead-frame, and a nut with a handle to tighten the bottom, substantially as set forth.

2. In combination with the bedstead-frame and flexible bed-bottom attached at one end to the bar B, which rests in bearings fixed to the side rails of the bedstead and at the other end to the bar K, which is guided on the side rails of the bedstead-frame, the tightening-screws L L', each made in two parts connected together by a joint-pin and secured at one end in the movable cross-bar of the flexible bed-bottom, and passing through the end rail of the bedstead, and a nut with a handle to tighten the bottom, substantially as and for the purposes set forth.

3. The combination, with the flexible bed-bottom A and bedstead-frame, of an inner tube or bar, C, around which the end of the flexible bottom is passed, and an outer tubular bar, B, and having a lateral slot for admitting clamping-bar C and holding the flexible material, cross-bolts D, for clamping the parts for the purpose of keeping them together when the bedstead is taken to pieces, and bearing-hooks H, fixed to the sides of the bedstead-frame, the bar K, fastened to the flexible bottom and guided between the side rails of the bedstead-frame, and suitable tightening mechanism, substantially as specified.

4. The flexible bed-bottom A and the tubular bars B and K, to which it is attached in the manner set forth, in combination with the flange-bearers H on the bedstead-frame and guides, and the hooks O, to retain the parts in position, substantially as set forth.

5. The combination, with the bedstead-frame, the flexible bed-bottom, the tubular bars B and K, supported on the side rails of the bedstead-frame, and to which the ends of flexible bottoms are attached, the sectional tightening-screws passing through the frame, substantially as specified.

6. The combination, with a bedstead-frame, a flexible bed-bottom resting entirely on the side rails thereof and attached at one end to a detachable cross-bar and at the other end to a movable cross-bar which is guided at each end on the side rails, and tightening mechanism for straining the flexible bottom, substantially as set forth.

7. The flexible bed-bottom A, the tubular bars B and K, to which the bottom is affixed, and the bedstead-frame, in combination with the flange-bearers H, which are fixed to the side rails, G, of the bedstead-frame so as to be adjustable lengthwise thereon, said side rails being formed with notches which fit on projections *e* on the corner-post sockets, substantially as set forth.

London, June 13, 1884.

THOMAS ALLEN.

Witnesses:
   J. WATT,
      17 *Gracechurch St., London,*
   PAUL MOONJAMES,
      40 *King St., Cheapside, London, E. C.*
   CHAS. BERKLEY HARRIS.